(No Model.)

D. EDWARDS.
PLOW.

No. 471,420. Patented Mar. 22, 1892.

Witnesses:
E. B. Bolton
J. L. Pilkington

Inventor:
David Edwards
By
his Attorneys.

UNITED STATES PATENT OFFICE.

DAVID EDWARDS, OF MELBOURNE, VICTORIA.

PLOW.

SPECIFICATION forming part of Letters Patent No. 471,420, dated March 22, 1892.

Application filed October 10, 1891. Serial No. 408,366. (No model.) Patented in Victoria July 23, 1891, No. 8,908.

*To all whom it may concern:*

Be it known that I, DAVID EDWARDS, engineer, a subject of the Queen of Great Britain, residing at Elizabeth Street, Melbourne, in the Colony of Victoria, have invented new and useful Improvements in Plows, of which the following is an exact, clear, and complete specification.

I construct plowshares with a cutting-blade on the land side and continue from such blade over the mold-board one or more spurs, fins, or wings, the combined purpose of both being that the land is more readily plowed or cut, while all surface rubbish—such as weeds and the like—are caught by the narrow wings and turned in onto the earth, that is finally turned over by the mold-board. Consequently such surface rubbish is covered or buried by the action of my invention. I find, also, that a similar spur or wing can be adapted for a similar purpose to the tines of a cultivator, and, further, in the shares of such as a drain-plow I find it an advantage to have a blade on the furrow side as well as on the land side.
By forming a cutting-blade on the share I dispense altogether with colters.

Figure 1:
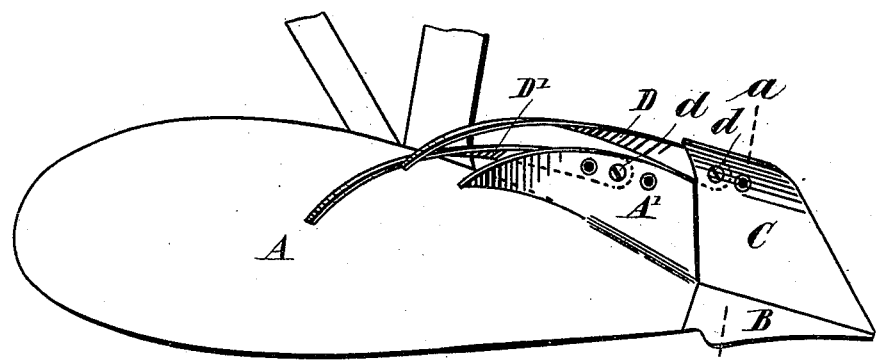
Figure 2:
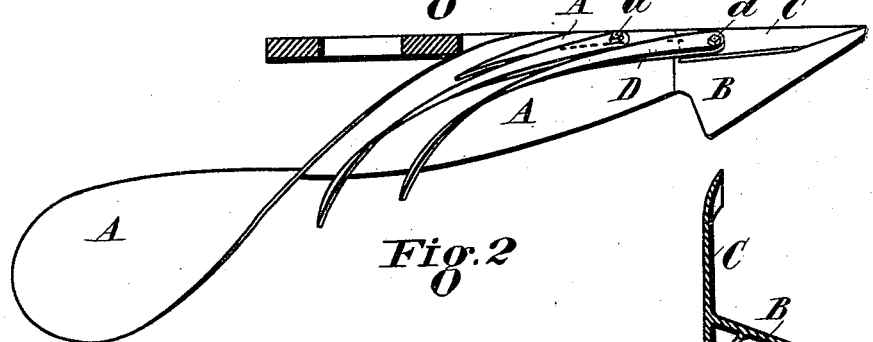

In order to have my invention clearly understood, I will describe it by reference to the accompanying sheet of drawings, in which—
Figure 1 shows a side view, and Fig. 2 a plan, of the mold-board A and share B of a plow, the blade C being formed on the land side of the share, while a breast-wing A', formed upon or secured to land edge of mold-board, springs from back end of blade and then takes a curve over the mold-board, as shown. The upper spur or wing D is secured to blade by countersink-bolt d, while the lower spur or wing D' is shown bolted in a similar manner to the breast A'. The holes shown in blade C and breast A' are to enable the position of the spurs or wings D and D' to be adjusted.

Figure 3:
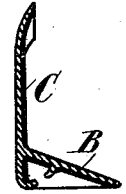
Figure 4:
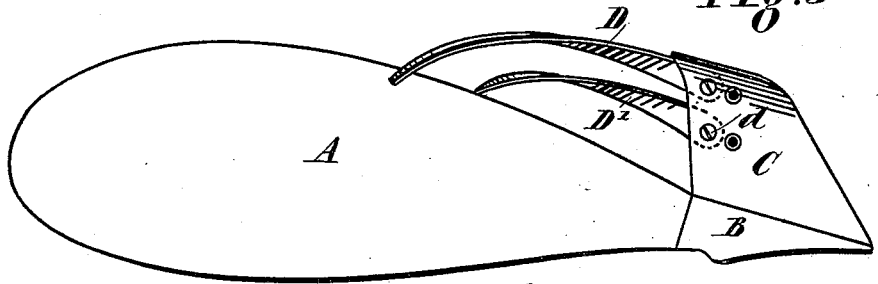

Fig. 3 is a cross-section at line *a a*, Fig. 1.
Fig. 4 shows the mold-board A, share B, and blade C similar to Fig. 1; but the spurs or wings D D' are both bolted to the blade C.

Figure 5:
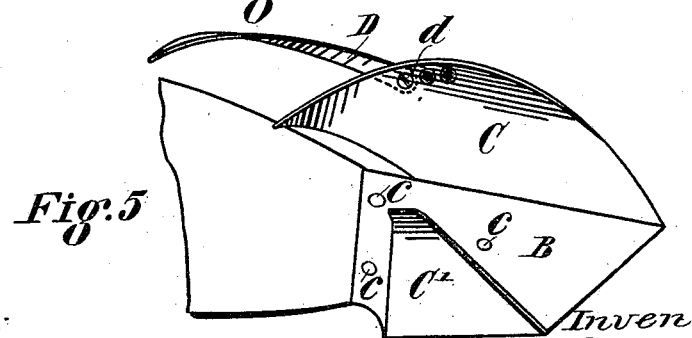

Fig. 5 shows a share B, suitable for a drain-plow, the blade C being continued backward and curved, as shown, and having a spur or wing D on it, while, further, the furrow or off side of share is provided with a blade C', so that both sides of the drain are cut at once. This double-blade share may either be constructed from plate-steel and secured upon an ordinary share with rivets *c*, or it may be formed with a socket to fit the plow-foot, as ordinarily. In this share it is essential that the blade C' is shallow enough to allow the cut ground to pass over it, the base of blade C' starting, as shown, from the inclined cutting-edge of the share.

I prefer that the cutting-blade should be formed on the share of a plow, as shown in Figs. 1 to 4, the curve or twist of the spurs or wings that project back from blade being similar to a section of the mold-board. When I attach a spur or breast—such as A'—to an ordinary mold-board, I form a flange on lower edge of breast to fit the mold-board or foot and secure it thereto with rivets or countersink head-bolts. The share and spurs or wings constructed according to my invention I prefer to make of steel, the share for a drain-plow having the double blade being also preferably formed of steel.

Having now particularly described and ascertained the nature of my said invention and in what manner the same is to be performed, I declare that what I claim is—

1. In combination, the mold-board with the share, a cutting-blade extending upwardly from the landside edge, and the wing or spur connected to and extending from the cutting-blade rearwardly over the mold-board, substantially as described.

2. In combination, the mold-board, a share having a cutting-blade C, curving toward the furrow edge, and the shallower cutting-blade C' on the furrow edge adapted to allow the earth to pass over it, the said share being adapted to be secured at the front end of the mold-board, substantially as described.

In witness whereof I have hereunto set my hand in presence of two witnesses.

DAVID EDWARDS.

Witnesses:
BEDLINGTON BODYCOMB,
FRED CHAMBERLAIN.